United States Patent [19]
Siegenthaler

[11] Patent Number: 5,320,695
[45] Date of Patent: Jun. 14, 1994

[54] METHOD OF FORMING A TIRE INSIDE A FORMING MOLD

[75] Inventor: Karl J. Siegenthaler, Rome, Italy

[73] Assignee: Bridgestone Corporation, Tokyo, Japan

[21] Appl. No.: 967,009

[22] Filed: Oct. 27, 1992

[30] Foreign Application Priority Data

Oct. 31, 1991 [IT] Italy ............... TO91A 000822

[51] Int. Cl.⁵ ............................................. B29D 30/08
[52] U.S. Cl. .................... 156/127; 156/129; 156/130; 264/326
[58] Field of Search .............. 156/110.1, 111, 123, 156/126, 127, 128.1, 128.6, 129, 130, 130.7, 394.1, 396, 406.2, 414, 415, 408, 421.6, 421.8; 264/501, 502, 326; 425/36, 46, 28.1, 35, 47, 56, 58

[56] References Cited

U.S. PATENT DOCUMENTS

| | | | |
|---|---|---|---|
| 3,276,930 | 10/1966 | Keefe, Jr. | 156/130 |
| 4,007,069 | 2/1977 | Takayanagi et al. | 156/123 |
| 4,738,738 | 4/1988 | Holroyd et al. | 156/129 |
| 4,743,322 | 5/1988 | Holroyd et al. | 156/123 |

FOREIGN PATENT DOCUMENTS

| | | |
|---|---|---|
| 0313506 | 4/1989 | European Pat. Off. |
| 1213334 | 3/1960 | France. |
| 929777 | 6/1963 | United Kingdom. |
| 1060673 | 3/1967 | United Kingdom. |
| 2133357 | 7/1984 | United Kingdom. |

OTHER PUBLICATIONS

Database WPIL, Section Ch, Week 8317, Derwent Publications Ltd., London, GB; Class A95, AN 83-39203K (17).

*Primary Examiner*—Geoffrey L. Knable
*Attorney, Agent, or Firm*—David A. Thomas

[57] ABSTRACT

A method of forming a tire (1) inside a forming mold (2) having an inner surface negatively reproducing the outer surface of the finished tire (1). The method provides for forming a second stage tread assembly (13) of the tire (1) in an annular housing (3b) defined by an annular body (3) constituting an outer portion of the forming mold (2), and by two auxiliary outer rings (47) fitted in releasable manner to the opposite axial ends of the annular body (3). The two auxiliary rings (47) are subsequently removed from the annular body for fitting the annular body (3), in place of the auxiliary rings (47), with two annular lateral plates (6) defining respective lateral portions of the forming mold (2).

8 Claims, 3 Drawing Sheets

METHOD OF FORMING A TIRE INSIDE A FORMING MOLD

BACKGROUND OF THE INVENTION

1. Technical Field

The present invention relates to a tire forming method. In particular, the present invention relates to a method of forming a tire inside a forming mold, the inner surface of which negatively reproduces the outer surface of the finished tire, the tire comprising an inner carcass and a second stage tread assembly.

SUMMARY OF THE INVENTION

It is an object of the present invention to provide a method enabling not only straightforward, low-cost forming of a tire inside a forming mold of the aforementioned type, but also correct removal of the formed tire in a manner not requiring the use of a mold of excessively complex mechanical design.

According to the present invention, there is provided a method of forming a tire inside a forming mold having an inner surface negatively reproducing the outer surface of the finished tire, wherein said tire comprises an inner carcass and a second stage tread assembly. Said method being characterized by the fact that it comprises a series of steps comprising forming a second stage tread assembly inside an annular housing comprising an annular body, and two auxiliary rings fitted in releasable manner inside respective seats formed on the opposite axial ends of said annular body, which constitutes an outer portion of said forming mold and presents an inner surface negatively reproducing the pattern of the tread cap of the finished tire; removing said two auxiliary rings; feeding said carcass inside said second stage tread assembly, and forming said carcass against said second stage tread assembly and said annular body; and fitting said annular body, in said seats, with two annular plates, each constituting a lateral portion of said forming mold.

In the above method, the inner surface of the annular body is limited solely to the tread cap, so that the shoulder portions of the tread are obviously formed against the inner surface of the auxiliary rings. Also, as the annular plates of the forming mold are fitted to the annular body in the same seats as the auxiliary rings, once the tire is formed and the annular plates removed, the shoulder portions of the tire are obviously exposed. With relatively little interference between the formed tire and the annular body, it enables the tire to be safely removed axially from the annular body, which may thus be a continuous, non-segmented body.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 6:
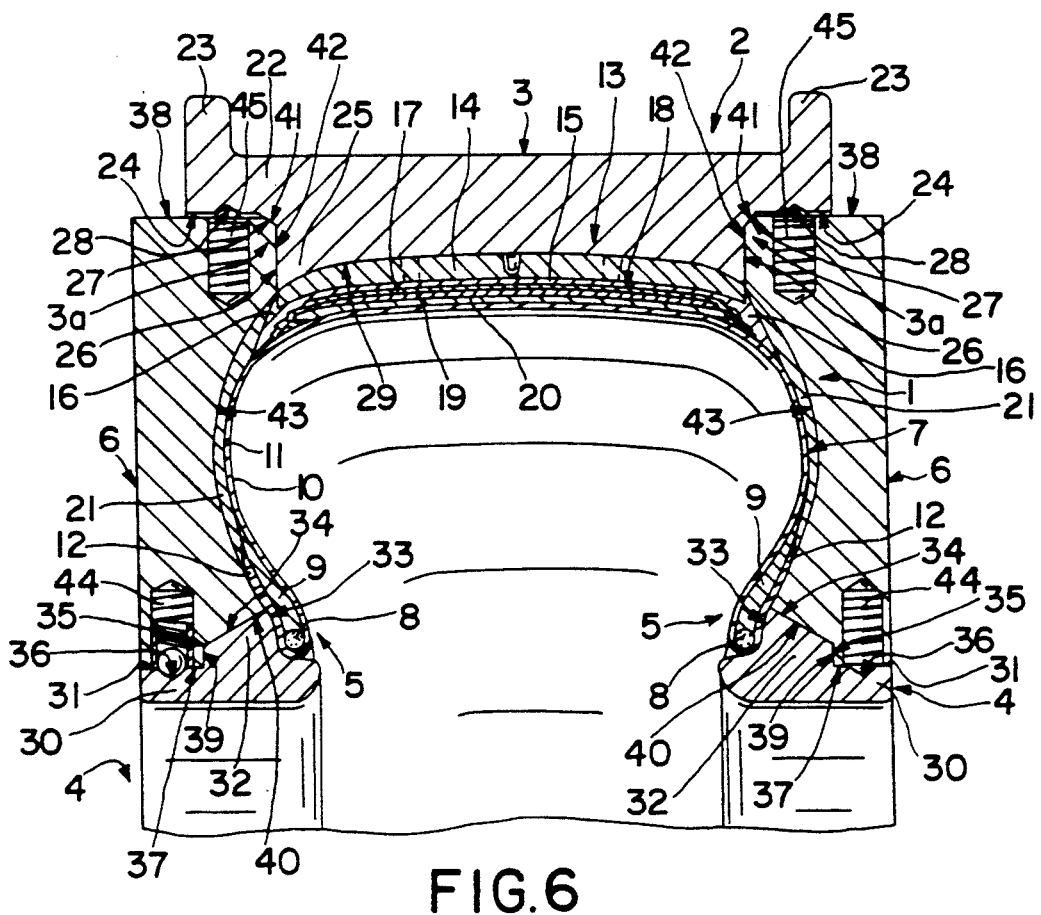

Number 1 in FIG. 6 indicates a green tire formed inside a substantially toroidal forming mold 2 comprising an outer annular body 3; two inner annular supports 4, each fitted to a respective bead portion 5 of tire 1; and two annular plates 6, each connecting a respective annular support 4 to a respective axial end of outer annular body 3. Each annular plate 6 has an outer peripheral portion connected to outer annular body 3 at a respective annular seat 3a formed on a respective axial end of outer annular body 3.

Tire 1 comprises a first stage carcass 7 comprising two metal beads 8, each having a respective substantially triangular-section filler 9, located at a respective bead portion 5. Carcass 7 also comprises a reinforced body ply 10 extending about beads 8; an innerliner 11 on the inner surface portion of ply 10 between beads 8; and two abrasion strips 12, each covering a respective portion of ply 10 about a respective bead 8.

As shown in FIG. 6, in addition to carcass 7, tire 1 also comprises a second stage assembly 13 defined, in the example shown, by an annular tread cap 14 having an inner cushion (not shown) housed inside an outer groove of a tread base 15, and two substantially triangular-section tabs 16 projecting laterally in relation to cap 14. In addition to a cover ply 17, base 15 also houses a reinforced tread belt 18 defined, in the example shown, by two reinforced tread plies 19 and 20, the first being outside the second.

Tire 1 in the example shown, also comprises two annular sidewalls 21 located outside body plies 10. Each sidewalls 21 has an inner peripheral portion covering part of a respective abrasion strip 12, and an outer peripheral portion covering a respective tab 16.

As shown in FIG. 6, outer annular body 3 is defined by a cylindrical ring 22 having two outer annular end ribs 23, and defined internally by a cylindrical surface 24. From a central portion of surface 24, there projects radially inwards an annular rib 25, the axial ends of which are defined by respective flat annular shoulders perpendicular to and blending with surface 24 via respective inward-tapering, truncated-cone-shaped surfaces 27. Surfaces 24, 26 and 27 combine to define the inner surface of a respective annular seat 3a.

Surface 24 presents two circumferential grooves 28, each outwards of a respective surface 27. Rib 25 is defined internally by an annular substantially barrel-shaped surface 29 negatively reproducing the pattern of finished tread cap 14.

As shown in FIG. 6, each annular support 4 comprises an annular plate 30, the outer cylindrical surface 31 of which, on the side facing the other annular support 4, presents a substantially triangular-section annular rib 32. Rib 32 is defined, on the side facing the other annular support 4, by a concave annular surface 33 so shaped as to mate with a respective abrasion strip 12. On the outward side, each annular rib 32 is defined by a truncated-cone-shaped surface 34 tapering outwards and connected to surface 31 by an annular shoulder 35. Annular surface 31 also presents an annular groove 36 outwards of annular shoulder 35.

As shown in FIG. 6, each annular plate 6 presents a cylindrical inner surface 37 and a cylindrical outer surface 38 positioned facing and substantially contacting, cylindrical surface 31 of respective annular support 4 and inner surface 24 of ring 22, respectively. On the side facing the other plate 6, each plate 6 is defined by an annular shoulder 39 adjacent to surface 37 and positioned facing and substantially contacting, annular shoulder 35 of respective annular support 4. A first truncated-cone-shaped surface 40 located adjacent to shoulder 39, is positioned contacting truncated-cone-shaped surface 34 of respective annular support 4. A second truncated-cone-shaped surface 41 located adjacent to surface 38, contacts respective truncated-cone-shaped surface 27. A flat annular surface 42 located adjacent to surface 41 contacts respective shoulder 26 of annular body 3. A concave annular surface 43 connects surfaces 40 and 42.

Each plate 6 presents a first number of spherical locking devices 44 evenly spaced along surface 37 and engaging groove 36 of respective annular support 4. A second number of spherical locking devices 45 is evenly spaced along surface 38 and engage respective groove 28. When engaged inside respective grooves 36 and 28, devices 44 and 45 lock respective plates 6 in an operating assembly position, wherein surfaces 43 connect surfaces 29 and 33 in such a manner as to define the inner surface of annular forming mold 2.

Figure 1:
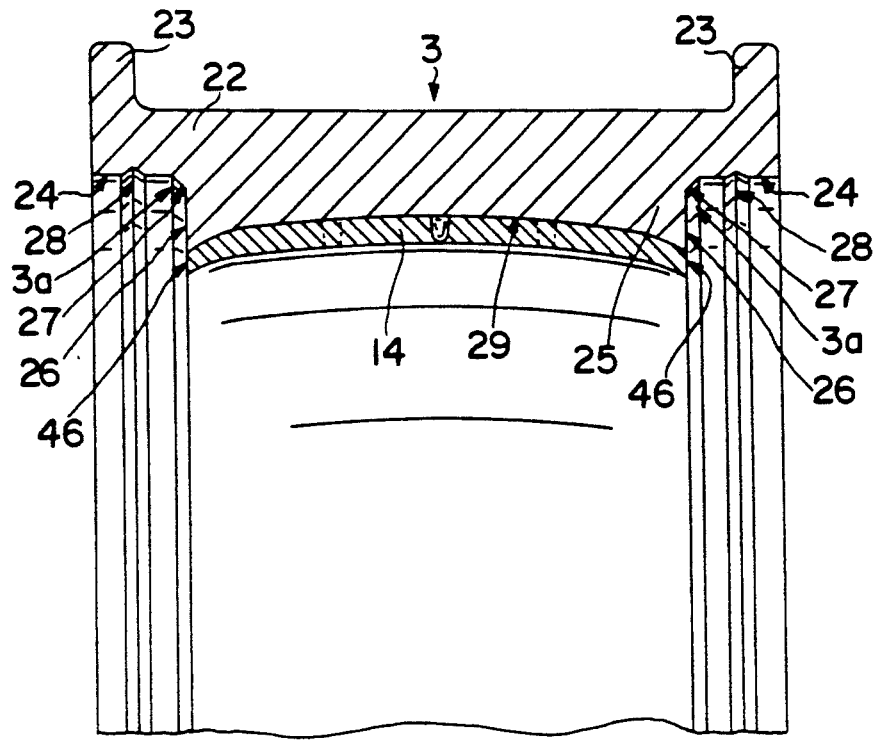
FIGS. 1 to 6 show schematic axial half sections of successive stages in the method according to the present invention.

As shown in FIG. 1, in actual use, outer annular body 3 is first used alone for forming tread cap 14 as described and claimed in co-pending U.S. patent application Ser. Nos. 07/966,986, filed Oct. 27, 1992, and 07/967,358, filed Oct. 27, 1992, to which full reference is made herein in the interest of full disclosure. When completed, tread cap 14 is defined laterally by two annular surfaces 46 coplanar with shoulders 26.

Figure 2:
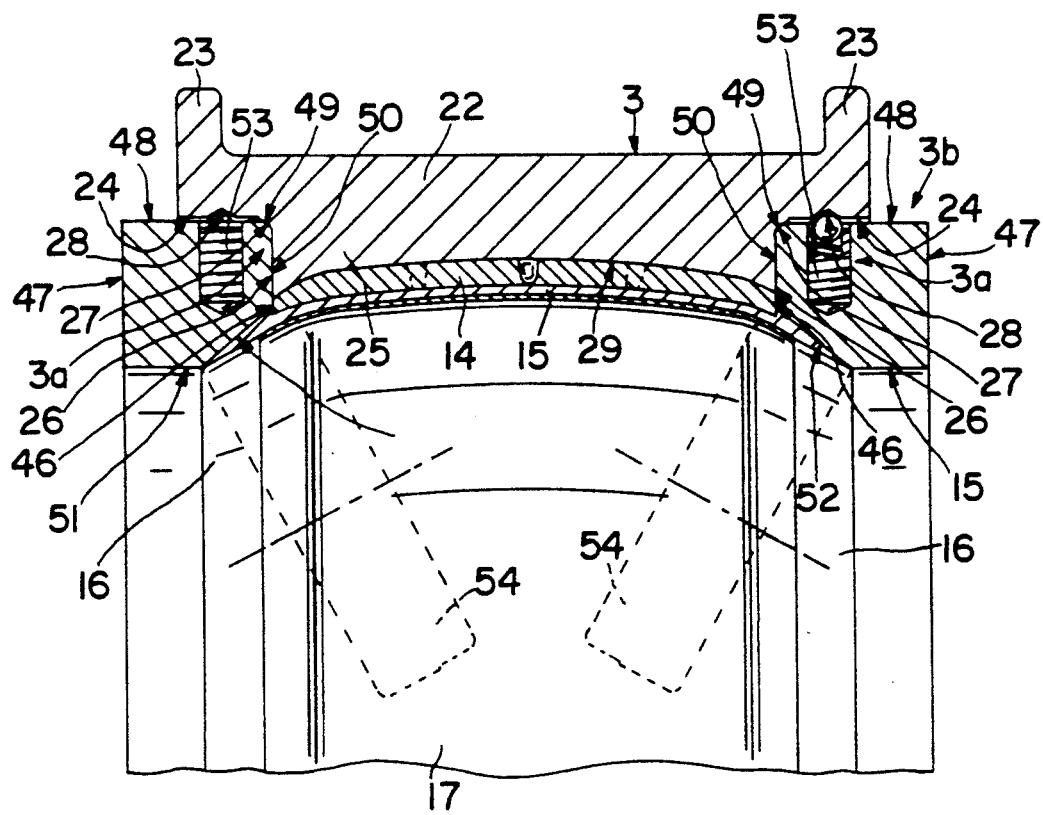

As shown in FIG. 2, annular body 3 is then fitted in seats 3a, and with two auxiliary rings 47 define, together with annular body 3, an annular housing 3b for forming second stage tread assembly 13.

Each auxiliary ring 47 presents a cylindrical outer surface 48 facing and substantially contacting, inner surface 24 of ring 22. On the side facing the other ring 47, each ring 47 is defined by a truncated-cone-shaped surface 49 which is adjacent to surface 48 and which contacts respective truncated-cone-shaped surface 27. A flat annular surface 50 is located adjacent to surface 49 contacts respective shoulder 26 of annular body 3. Each ring 47 includes a cylindrical inner surface 51 and a truncated-cone-shaped surface 52 tapered oppositely to surface 49 and connecting surfaces 50 and 51. Each ring 47 presents a number of spherical locking devices 53 equally spaced along surface 48 and engaging respective groove 28 for locking ring 47 to annular body 3.

As shown in FIG. 2, each surface 50 projects inside the inner edge of respective shoulder 26, and is positioned facing the part of respective surface 46 left exposed by respective tab 16 of base 15. Each truncated-cone-shaped surface 52 constitutes the outer forming surface of a respective tab 16, which is preferably formed against respective surface 52 via internal stitching by rollers 54 shown by the dotted line in FIG. 2.

Figure 3:
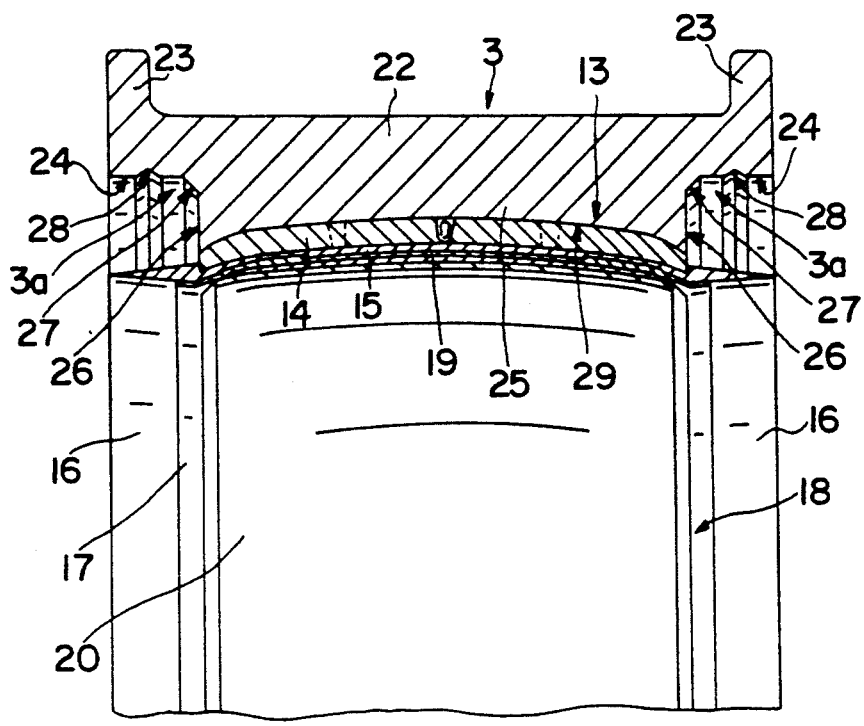
Figure 4:
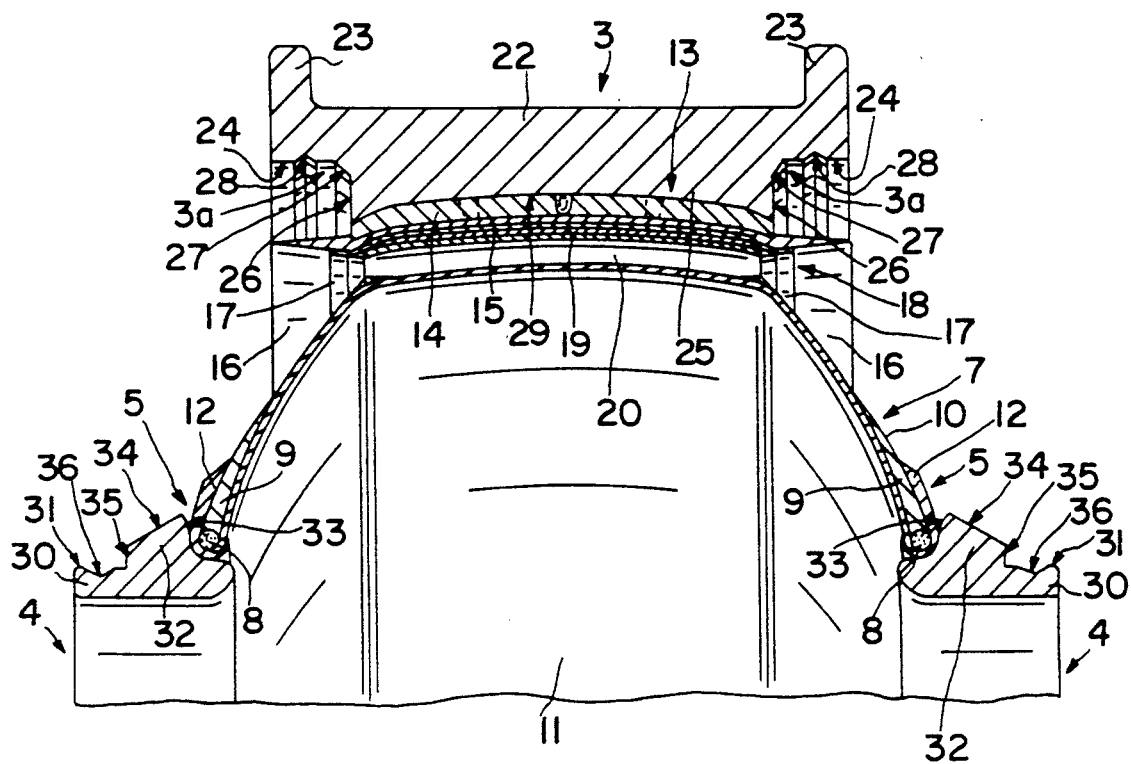
Figure 5:
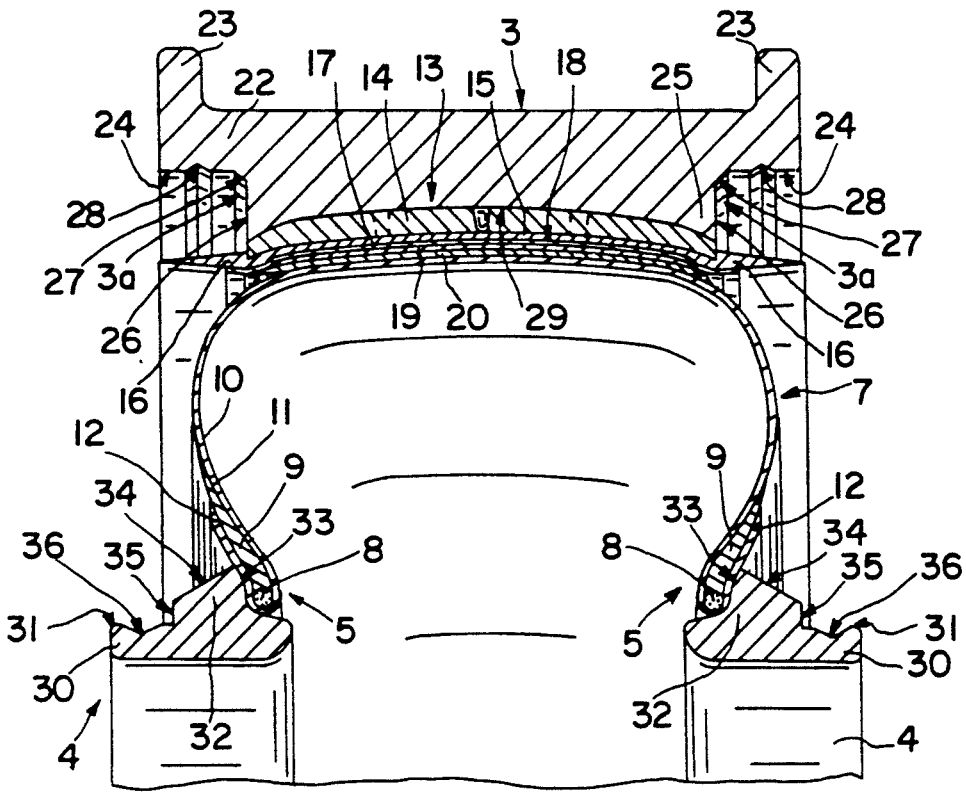

Second stage tread assembly 13 is then completed by fitting belt 18 inside base 15 in a known manner (not shown). At this point, auxiliary rings 47 are removed, and as shown in FIG. 3, tabs 16 which are no longer supported by auxiliary rings 47, are flexed outwards of the original forming position, to enable carcass 7 to be inserted inside and subsequently formed against tread assembly 13 (FIGS. 4 and 5). Outward flexing of tabs 16 may be achieved either by rolling, using the same rollers 54, or centrifugally by rotating annular body 3 about its axis.

Once carcass 7 has been formed against tread assembly 13, tabs 16 are restored to their former position, and annular plates 6 assembled. Plates 6 not only provide for locking annular supports 4 in relation to annular body 3 to complete forming mold 2, they also provide for fitting carcass 7 with sidewalls 21 fitted beforehand, to the inner surface of respective annular plates 6.

In other words, auxiliary rings 47 not only provide, as already stated, for greatly simplifying the design of annular body 3 by minimizing interference between annular body 3 and tire 1, they also provide for accurately forming inner portions of tire 1, such as tabs 16, and greatly simplifying application of sidewalls 21 on tabs 16.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of forming a tire inside a forming mold having an inner surface negatively reproducing the outer surface of the finished tire, said tire comprising an inner carcass and a second stage tread assembly which second stage tread assembly has an annular tread cap and at least one belt; said method comprising the steps of providing an annular housing comprising an annular body and two auxiliary rings fitted in releasable manner inside respective seats formed on the opposite axial ends of said annular body, which annular body constitutes a radially outermost portion of said forming mold and presents an inner surface negatively reproducing the pattern of the tread cap on the finished tire; assembling said annular body and said two auxiliary rings to form said annular housing; forming a second stage tread assembly by installing said belt on said tread cap inside said annular housing; removing said two auxiliary rings from said annular body; feeding said carcass inside said second stage tread assembly after said two auxiliary rings are removed from said annular body; forming said carcass against said second stage tread assembly and said annular body; and fitting an annular plate into each of said seats of said annular body such that each annular plate constitutes a lateral portion of said forming mold.

2. A method as claimed in claim 1, for producing a tire comprising a tread base located inside said tread cap and having two lateral tabs projecting from opposite sides of said tread cap; comprising the further step of providing said auxiliary rings with an inner surface negatively reproducing the outer shape of a respective said tab.

3. A method as claimed in claim 2, in which each of said tabs is stitched against said inner surface of a respective one of said auxiliary rings.

4. A method as claimed in claim 2 in which following removal of said two auxiliary rings, said two tabs of said tread base are flexed outwards of their original forming position for enabling insertion of said carcass inside said second stage tread assembly.

5. A method as claimed in claim 4, in which said tabs are flexed outwards by the step of applying an outward pressure on said tabs via rollers to force said tabs radially outwardly.

6. A method as claimed in claim 4, in which each of said tabs are flexed outwards by the step of rotating the annular body, which rotation results in centrifugal force acting on said tabs, which centrifugal force causes said tabs to flex radially outwardly.

7. A method as claimed in claim 1 for producing a tire comprising two annular sidewalls applied externally to said carcass further including the steps of fitting each said annular sidewalls to the inner surface of a respective one of said annular plates; and fitting said sidewalls to said carcass when said annular plates are fitted to said annular body.

8. A method as claimed in claim 7 for producing a tire comprising a tread base located inside said tread cap and having two lateral tabs projecting from opposite sides of said tread cap, in which following removal of said two auxiliary rings, said two tabs of said tread base are flexed outwards of their original formed position for enabling insertion of said carcass inside said second stage tread assembly, and, in which said tabs are restored to their original forming position prior to assembly of said annular plates.

* * * * *